United States Patent [19]

Müller

[11] 4,057,501

[45] Nov. 8, 1977

[54] FILTER APPARATUS AND FILTER ELEMENT THEREFOR

[76] Inventor: Hans Müller, Im Allmendli, 8703 Erlenbach, Switzerland

[21] Appl. No.: 694,196

[22] Filed: June 9, 1976

[30] Foreign Application Priority Data

June 17, 1975 Switzerland ............... 7963/75
July 11, 1975 Switzerland ............... 9208/75

[51] Int. Cl.² ........................................... B01D 33/28
[52] U.S. Cl. .................................. 210/331; 210/333 R; 210/346; 210/486
[58] Field of Search ............... 210/331, 333 R, 334, 210/344, 345, 346, 347, 369, 409, 486, 487

[56] References Cited

U.S. PATENT DOCUMENTS

| 925,554 | 6/1909 | Blaisdell et al. | 210/487 |
|---|---|---|---|
| 2,540,362 | 2/1951 | Winslow et al. | 210/486 |
| 2,544,402 | 3/1951 | Tessmer | 210/331 |
| 2,772,000 | 11/1956 | Hunziker | 210/347 |
| 2,878,942 | 3/1959 | Whitmore | 210/331 X |
| 3,161,592 | 12/1964 | Dominguez | 210/331 |
| 3,190,449 | 6/1965 | Muller | 210/331 X |
| 3,263,819 | 8/1966 | Schmidt et al. | 210/486 |
| 3,655,049 | 4/1972 | Kracklauer | 210/333 X |

FOREIGN PATENT DOCUMENTS

| 571,911 | 1/1958 | Italy | 210/331 |
|---|---|---|---|
| 655,623 | 7/1951 | United Kingdom | 210/346 |
| 384,749 | 12/1932 | United Kingdom | 210/331 |

*Primary Examiner*—Thomas G. Wyse
*Assistant Examiner*—Robert H. Spitzer
*Attorney, Agent, or Firm*—Michael J. Striker

[57] ABSTRACT

A filter element for a filter apparatus comprises a rigid support plate on at least one side of which is spanned a generally square filter cloth. This filter cloth may be formed as a pair of panels joined permanently together on three sides so as to form a pocket and having a fourth side which can be closed by a clamp or the like. The support is slipped into the pocket and a plurality of such filter elements are spaced along a rotatable hollow shaft centered in a filter chamber to which a solution to be filtered is fed. During operation the filtrate is pumped out of the hollow shaft through the filter cloth on which filter cake deposits. For cleaning of the cloth the shaft is rotated and the filter cake is washed off with a liquid spray.

14 Claims, 12 Drawing Figures

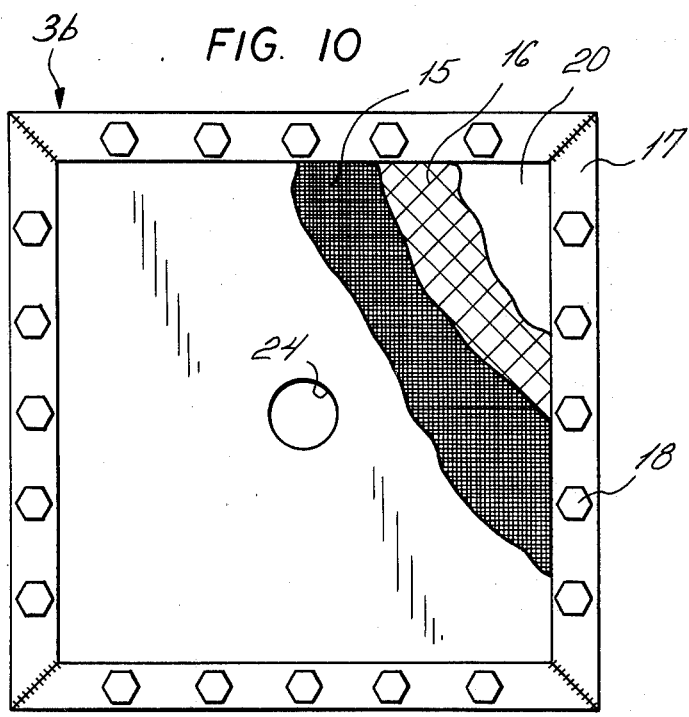
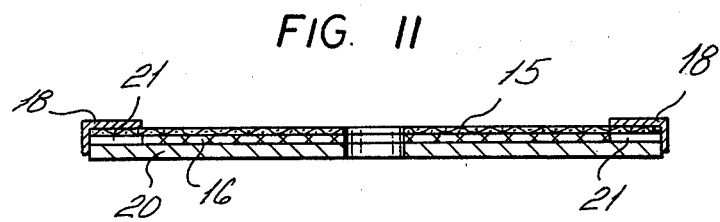

FILTER APPARATUS AND FILTER ELEMENT THEREFOR

BACKGROUND OF THE INVENTION

The present invention relates to a filtering apparatus. More particularly this invention concerns a filter element usable in a filtering apparatus wherein a separable suspension to be filtered is forced under pressure into the filter element.

A filtering apparatus is known having a housing defining a closed chamber in which is provided a hollow shaft carrying a plurality of axially spaced filter elements. Each of these elements comprises a support normally of porous construction and a filter cloth secured to at least one face of the support.

As a rule such supports are round so that the filter element closely fills the interior of the chamber. Such shape also facilitates rotating the filter elements during sluicing-off of filter cake that has built up on the filter elements. The filter elements in this arrangement are rotated as a liquid is squirted on them to loosen the filter cake that is then centrifugally driven off.

It is also known to have nonrotatable rectangular filter elements provided in a chamber in such manner as to be nonrotatable. With the rotatable filter elements the filtrate is drawn off through the central hollow shaft on which the rotatable elements are carried, but with the nonrotatable elements the filtrate is drawn off through channels that surround the filter surfaces.

Various prior-art filters are described in German Pat. No. 877,742, U.S. Pat. Nos. 3,107,217 and 3,190,449 as well as in the article by B. Spiekermeier and J. Stebler appearing in Maschinenmarkt on July 2, 1974 (Vogel-Verlag Wurzburg; vol. 53).

SUMMARY OF THE INVENTION

It is an object of the present invention to provide an improved filtering apparatus.

Another object is to provide an improved filter element for such an apparatus.

Yet another object is to provide an improved filter element wherein the filter cloth is used advantageously, but wherein excellent cleaning of the filter elements is possible.

These objects are attained according to the present invention in a filtering apparatus wherein a plurality of axially spaced polygonal filter supports are mounted on a hollow shaft extending axially through a closed chamber. Each of the supports has at least one face provided with a polygonal panel of filter cloth. Thus, the material constituting the filter cloth is used with maximum efficiency. At the same time excellent sluicing of the filter cake off the filter elements can be obtained.

According to yet another feature of this invention the filter cloth is formed as a pair of juxtaposed and coextensive generally square panels having three sides permanently joined together so as to form a pocket. Openable means is provided joining the other sides of the panels together and the flat stiffening member or support is provided within this pocket. Thus it is possible to make a very inexpensive filter element which can readily be changed merely by opening the one side, pulling it off, and replacing it with another whose open side is then easily closed.

In accordance with the present invention the three sides of the filter-cloth pocket may be stitched or welded together.

In accordance with yet another feature of this invention the corners of the filter-cloth panels are cut off so as to give them a generally octagonal shape and the support received in the pocket constituted by the cloth is generally square and has a maximum dimension which is equal to at most two-thirds of the maximum dimension of the pocket. Thus it is possible to slip such a filter element into one open side of the generally octagonal filter cloth.

The support may be in accordance with this invention an imperforate metal plate either formed with corrugations or other formations giving it a nonplanar shape or may be flanked by a pair of screens so that the filter can be sucked out from within the filter-cloth pocket.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 4b is a side view of the support usable with the filter cloth of FIG. 4a;

FIG. 10 is a top view partly broken away of a filter element according to the present invention; and FIG. 11 is a vertical section through the filter element of FIG. 10.

DESCRIPTION OF THE PREFERRED EMBODIMENTS

Figure 1:
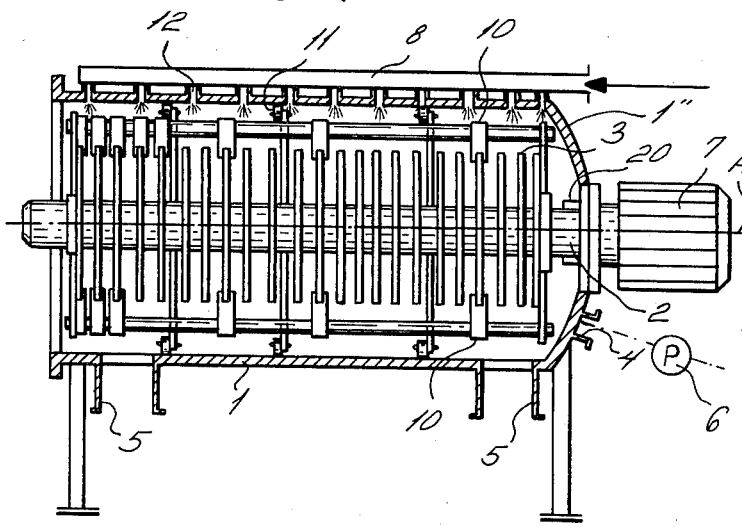
FIG. 1 is a vertical and axial section through an apparatus according to this invention with the end cover removed.
Figure 2:
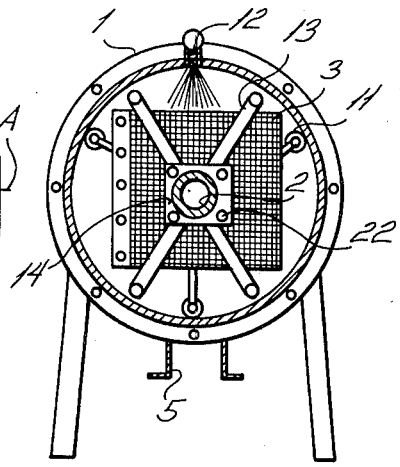
FIG. 2 is a vertical cross section through the apparatus of FIG. 1.
Figure 3:
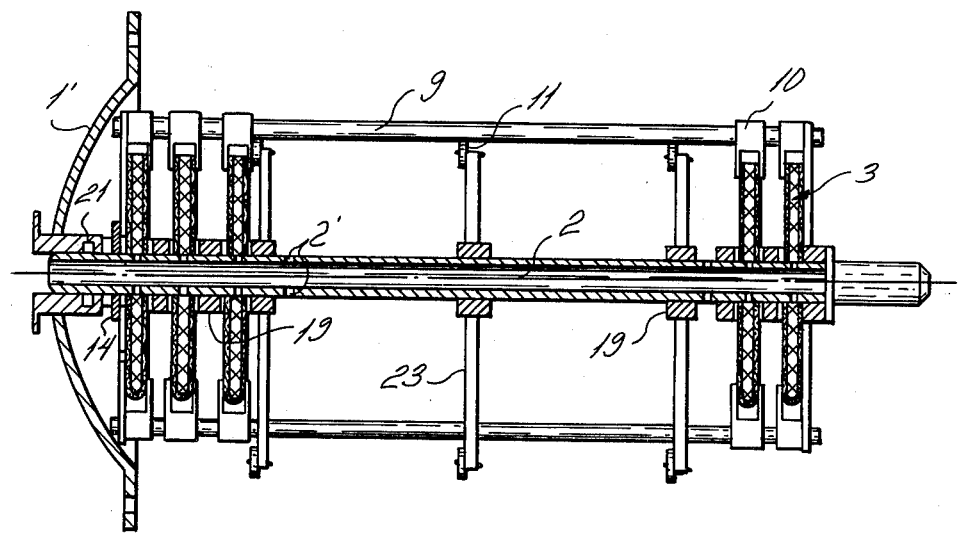
FIG. 3 is a large-scale sectional view of a portion of the apparatus of FIG. 1.

As shown in FIGS. 1–3 the filter apparatus according to the present invention comprises a cylindrical housing 1 having a horizontal central axis A, removable cover 1' at one end and a closed opposite end 1''. A hollow shaft 2 is rotatably supported on this housing about the axis A by a bearing 20 at the end 1'' and a bearing 21 at the cover 1'. This shaft 2 is formed with a multiplicity of radially opening perforations 2' so that liquid can pass inwardly through these openings 2'. A motor 7 is mounted on the end 1'' for rotation of the shaft 2 about the axis A.

A plurality of rectangular filter elements 3 are carried on the shaft 2, each element 3 extending in a plane perpendicular to the axis A. Each of these elements 3 is spaced from the adjoining elements on the shaft 2 by means of spacer rings 19, and clips 10 carried on axially extending rods 9 ensure proper axial spacing of these elements 3. The rods 9 are carried on a spider 13 in a rectangular array, the spider 13 being bolted to a flange 14 on the shaft 2. In addition the shaft 2 is provided with three sets of angularly equispaced arms 23 each carrying a roller 11 that engages the inside surface of the housing 1. Thus, these rollers 11 serve to rotationally support the entire assembly shown in FIG. 3 within the drum 1.

During normal operation a suspension containing particles to be filtered from a liquid is fed into the apparatus by a pump P at an inlet 4 and clear filtrate leaving the interior of the shaft 2 by the outlet 6. During such operation the motor 7 is not energized so that the shaft 2 stands still. A filter medium such as diatomaceous earth is added to the suspension to be filtered at the beginning of each filtering cycle so that it forms a filter cake on the elements 3.

Once the filter cake has become too thick or is clogged the pump P is turned off and the motor 7 is energized. This causes the filter elements 3, the shaft 2, the rods 9, and the associated structure to rotate in the housing 1 about the axis A. Simultaneously lower outlets 5 are opened on the housing and nozzles 12 connected to a manifold 8 squirt liquid between the rotating filter elements 3. This effects an extremely thorough washing-off of the filter cake on the elements 3.

Figure 4A:
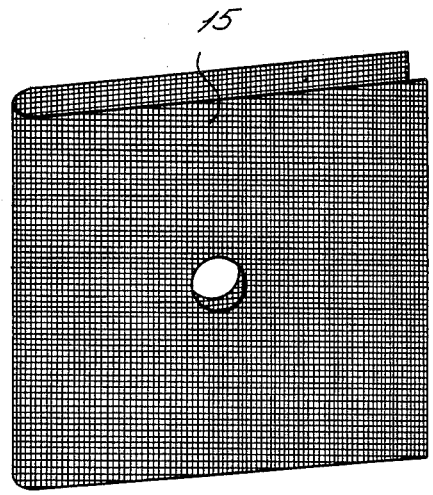
FIG. 4a is a side view of a filter cloth in accordance with this invention.
Figure 4B:
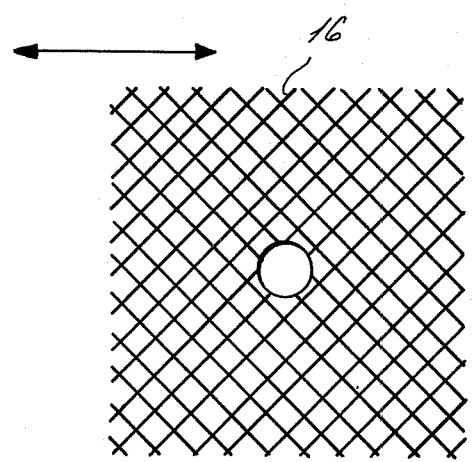
Figure 5:
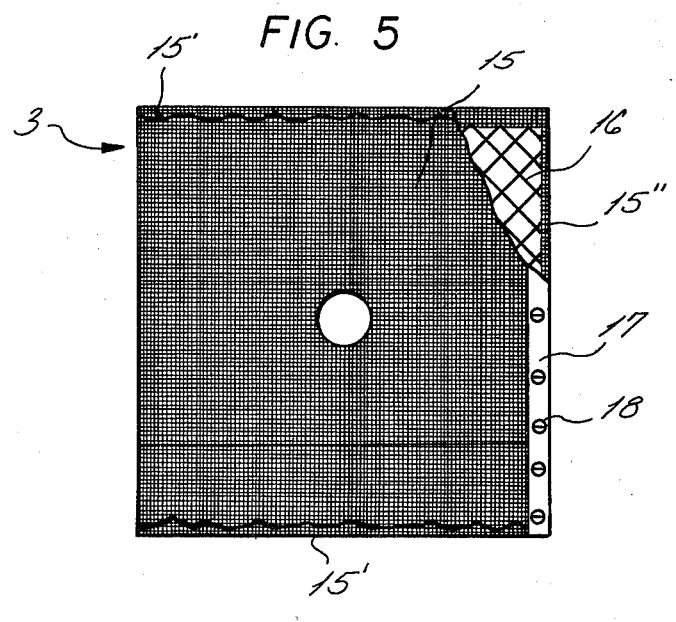
FIG. 5 is a side view partly broken away of a filter element as used in FIGS. 1–3 and employing the cloth and support of FIGS. 4a and 4b.

FIGS. 4a, 4b, and 5 show a filter element 3. This element comprises a rectangular piece 15 of filter cloth bent over so as to form a pocket in which is received a rectangular support screen 16. The edges 15' of the pocket are stitched tightly together and the edges 15" are closed after insertion of the screen 16 by clamping these edges between a pair or rigid bars 17 held together with screws 18. Thereafter, the entire assembly is mounted on the shaft 2 and locked in place via bolts 22 (FIG. 2).

Figure 6:
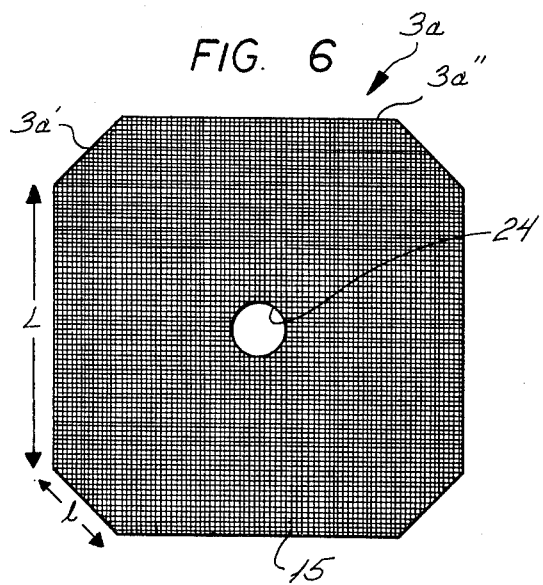
FIG. 6 is a view similar to FIG. 4a showing another cloth in accordance with this invention.

FIG. 6 shows a generally square filter element 3a formed with a central hole 24 like the element 3. This element 3a has cut-off corners 3a' which are straight and have a length 1 equal to less than one-third the length L of the longer straight side 3a" of the element 3a.

Figure 7:
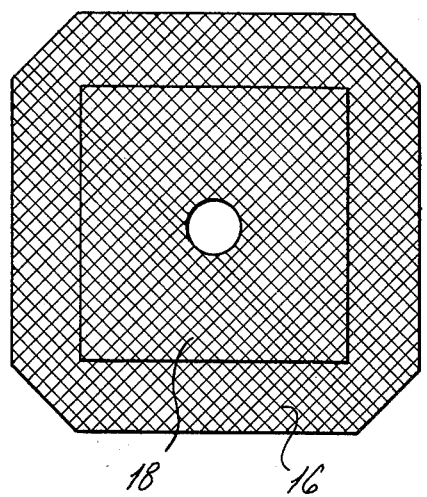
FIG. 7 shows in side view a filter element according to this invention.
Figure 8:
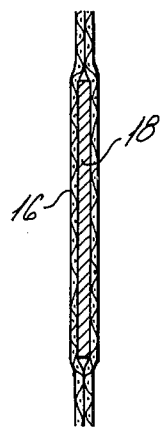
FIG. 8 is a vertical section through the element of FIG. 7.

FIGS. 7 and 8 show how such a filter element 3a is made. It is provided internally with a metal plate 18 which is square and has sides whose length is equal to less than L. This plate 18 is surrounded on both sides with support screens 16 that are then received within the pocket 15 shown in FIG. 6. In this arrangement the plate 16 is metallic, planar, and imperforate.

Figure 9:
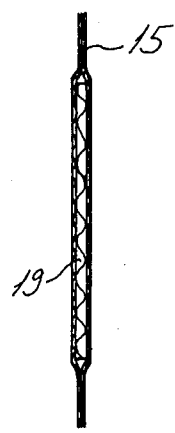
FIG. 9 is a view similar to FIG. 8 showing another filter element according to this invention.

FIG. 9 shows how the plate 18 can be replaced by a plate 19 that is profiled so that the screens 16 can be dispensed with and the cloth 15 can be applied directly over this plate 19.

With the arrangement shown in FIGS. 6 and 7 it has been found possible to cut off the corners of the panel 15 as indicated by removing a triangle having a base corresponding to the edge 3a' with the length of 5 cm. This reduces the effective surface area of the filter element, equal to 200 cm² here, by 2%. At the same time the total volume of the housing 1 can be reduced by approximately 18%, by reducing its diameter by 10 cm. This makes for a considerable saving in first cost of the apparatus.

FIGS. 10 and 11 show an element 3b comprising an imperforate base plate 20 on the bottom, a coarse support screen 16, and a fine filter cloth 15 all of square shape. The edge is closed up on all four sides by bars 17 and screws 18 as described above. In addition a seal 21 may be provided around the screen 16 and between the cloth 15 and the base plate 20.

With the system according to the present invention it is therefore possible to produce a very inexpensive filter element which can readily be cleaned. Such an arrangement has the considerable cost advantages and construction advantages of the nonrotatable types with many of the operational advantages of the rotational filter types.

It will be understood that each of the elements described above, or two or more together, may also find a useful application in other types of apparatus differing from the types described above.

While the invention has been illustrated and described as embodied in a filter apparatus, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A filtering apparatus comprising:
    a cylindrical housing having a horizontal central axis and defining a closed chamber;
    means for introducing a liquid carrying particles into said chamber;
    a hollow elongated shaft in said chamber;
    a plurality of laterally extending arms on said shaft provided with rollers riding on the inside of said housing;
    a plurality of generally square and rigid filter supports fixed and spaced longitudinally on said shaft with same passing generally centrally through said supports;
    a respective pocket of filter cloth completely and snugly surrounding each of said filter supports, each pocket being formed of a pair of juxtaposed and coextensive generally square filter-cloth panels having three sides permanently joined together and a fourth open side, said shaft passing generally centrally through said pockets;
    openable means at each of said pockets joining the respective fourth sides together for forming a filter interior inside each of said pockets, said shaft opening transversely into said interiors;
    means for withdrawing liquid from inside said shaft and thereby from said interiors, whereby said particles form filter cake on said panels;
    means for rotating said shaft, said supports, said pockets, said arms, and said openable means jointly; and
    means for spraying a rinse liquid on said pockets during rotation thereof for washing off said filter cake.

2. The apparatus defined in claim 1 wherein said openable means includes a pair of rigid bars and a plurality of screws clamping same together with said fourth sides therebetween.

3. The apparatus defined in claim 1 wherein at least two of said three sides of each pocket are welded together.

4. The apparatus defined in claim 1 wherein at least two of said three sides of each pocket are stitched together.

5. The apparatus defined in claim 1 wherein said panels have cutoff corners, whereby said pocket is generally octagonal.

6. The apparatus defined in claim 5 wherein each support is flat and has a maximum dimension equal to at least two thirds the maximum dimension of the respective panels.

7. The apparatus defined in claim 1 wherein each support is an imperforate metal plate and a pair of screens flanking the respective plate.

8. The apparatus defined in claim 7 wherein each plate is smooth and planar.

9. The apparatus defined in claim 1 wherein each support is a nonplanar imperforate metal plate.

10. The apparatus defined in claim 9 wherein said panels lie directly against the respective plate.

11. The apparatus defined in claim 1, further comprising holding rods extending generally parallel to said shaft and secured to the peripheries of said supports and said panels generally at the corners thereof.

12. The apparatus defined in claim 1, further comprising spacers between said pockets.

13. A filtering apparatus comprising:
   a cylindrical housing having a horizontal central axis and defining a closed chamber;
   means for introducing a liquid carrying particles into said chamber;
   a hollow elongated and horizontal shaft in said chamber;
   a plurality of laterally extending arms on said shaft provided with rollers riding on the inside of said housing;
   a plurality of generally square and rigid upright filter plates fixed and spaced horizontally on said shaft with same passing generally centrally through said plates, each plate being fluid impervious and having two faces;
   a respective generally square panel of filter cloth covering at least one face of each of said plates;
   means for securing the edges of each of said panels to the edges of the respective plate and thereby forming a filter interior between each of said panels and the respective plate, said shaft passing generally centrally through said panels;
   means for draining of liquid from inside said shaft and thereby from said interiors, whereby said particles form filter cake on said panels;
   means for rotating said shaft, said arms, said plates, said panels, and said openable means jointly; and
   means for spraying a rinse liquid on said pockets during rotation thereof for washing off said filter cake.

14. The apparatus defined in claim 13 wherein said means for introducing includes a pump for forcing said liquid carrying said particles under pressure into said chamber.

* * * * *